UNITED STATES PATENT OFFICE.

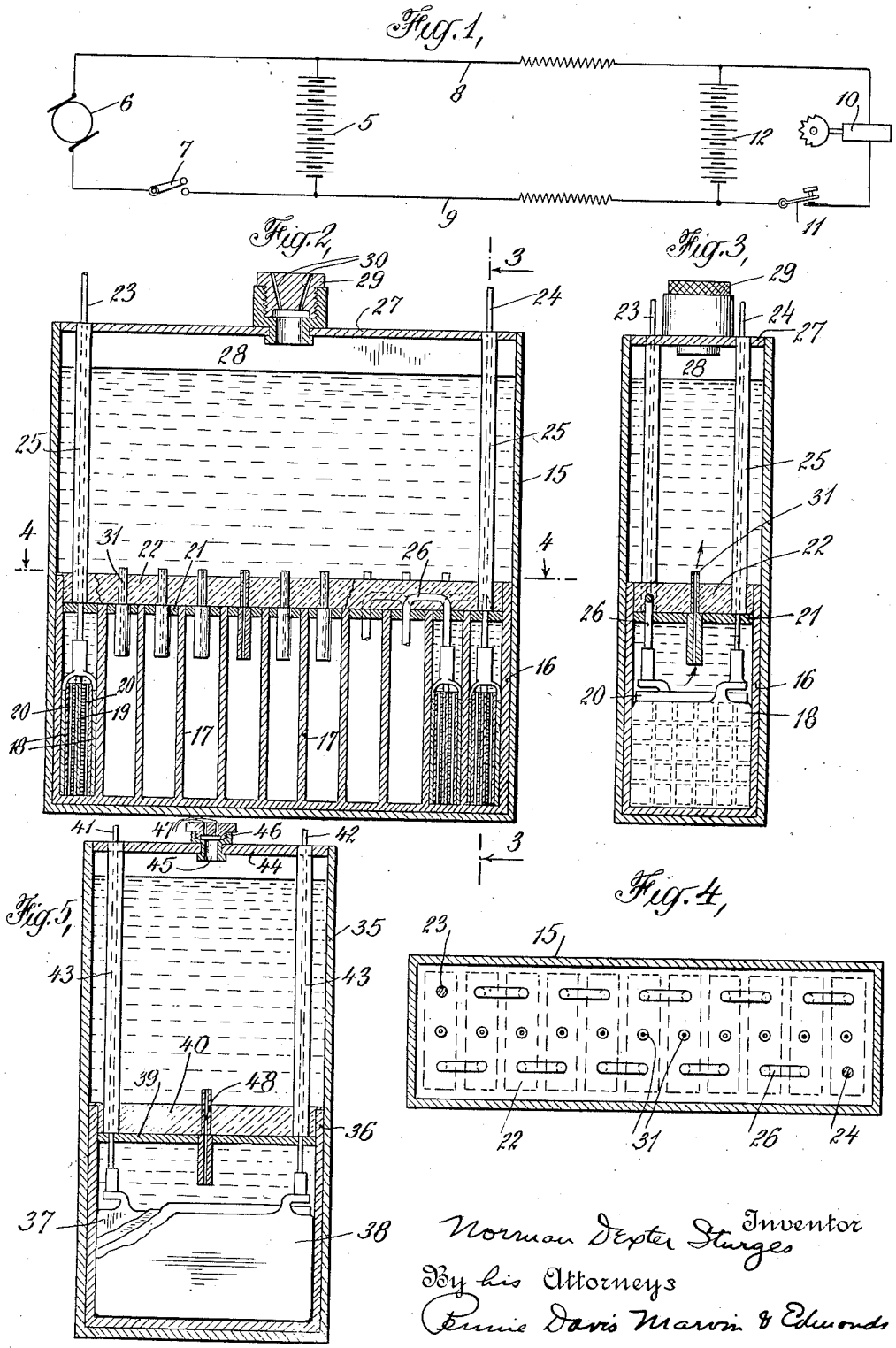

NORMAN DEXTER STURGES, OF BELLEROSE QUEENS, NEW YORK.

SELF-FILLING STORAGE BATTERY.

1,327,121.      Specification of Letters Patent.      Patented Jan. 6, 1920.

Application filed August 6, 1919. Serial No. 315,621.

*To all whom it may concern:*

Be it known that I, NORMAN DEXTER STURGES, a citizen of the United States, residing at Bellerose Queens P. O., in the county of Nassau, State of New York, have invented certain new and useful Improvements in Self-Filling Storage Batteries; and I do hereby declare the following to be a full, clear, and exact description of the invention, such as will enable others skilled in the art to which it appertains to make and use the same.

This invention relates to storage batteries and particularly to a self-filling storage battery which is of marked utility in telephone circuits as hereinafter explained, although by reference to such circuits I do not propose to necessarily limit the invention to the use therein.

An object of the invention is to provide a storage battery which will be automatically supplied with liquid from time to time as the electrolyte is depleted by electrolysis or other causes, thus insuring the continued efficient operation of the battery for long intervals without attention.

A further object of my invention is the provision of a storage battery which is peculiarly adapted for use as a source of current at isolated stations where the battery electrolyte cannot be conveniently renewed at frequent intervals.

Further objects and advantages of my invention will be apparent as it is better understood by reference to the following specification when read in connection with the accompanying drawing, in which—

Figure 1 is a diagrammatic illustration of a circuit in which my improved battery is adapted to be employed;

Fig. 2 is a longitudinal section through the preferred form of battery;

Fig. 3 is a section on the line 3—3 of Fig. 2;

Fig. 4 is a section on the line 4—4 of Fig. 2; and

Fig. 5 is a transverse section through a form of my battery employing a single cell.

The peculiar object, for which my battery is particularly designed and for which it may be most advantageously used, has to do with telephone circuits where isolated stations are provided with intermittently actuated electromagnetic devices. Such devices require a relatively strong surge of current for effective operation. An isolated station is connected, however, to the central station and source of power by a cable having a relatively high resistance, which prevents the flow of sufficient current to actuate the device at the isolated station during a momentary closure of the circuit.

It is desirable, therefore, to provide a floating battery at the isolated station, which will act as a reservoir for current to insure proper operation of the electro-magnetic device when the circuit is closed. Such a battery may be connected in parallel to the line and will receive current therefrom until fully charged. When the circuit is closed a portion of the current is discharged and recharging is again gradually accomplished by current flowing from the central station.

The difficulty, heretofore presented in such installations, is that storage batteries are subject to loss of liquid by evaporation and electrolysis, so that, unless periodically refilled, they rapidly deteriorate and become useless. The isolated character of the station precludes such refilling and it may be here noted that by isolated, I imply only that it is not practicable for financial or other reasons to have a competent battery man visit the station at regular intervals to replenish the battery.

To overcome this difficulty, I have devised a battery adapted for use at isolated stations and provided with a reservoir of liquid from which liquid is automatically supplied from time to time to the battery as required, but without the use of mechanism.

I have discovered that it is possible to provide a supply of liquid, so arranged with respect to the battery cells, that gravity or differences in barometric pressure will cause the liquid to flow into the cells under certain conditions. To prevent short circuiting of the battery, it is essential that the inlets for the liquid be normally maintained dry. This result I am enabled to accomplish by employing a duct of capillary diameter and substantial length connecting each cell to the reservoir. For example, the ducts may be three-quarters of an inch long and substantially one thirty-second of an inch in diameter.

Under normal conditions the gas generated in the battery escapes through the ducts and passes upwardly through the liquid in the reservoir in the form of bubbles of substantial size. These bubbles, upon reaching the upper surface, emerge therefrom with the production of much less fume and spray than is usually produced when the gases escape directly from the cells to the atmosphere. This is an additional advantage of my battery and adapts it particularly for use in isolated stations. Whatever spray accompanies the breaking of the bubbles at the surface, is collected on the walls of the air space above the liquid in the reservoir, the substantially mist-free gas escaping through a vent hole provided in the top of the reservoir.

In accordance with the proposed arrangement of the battery at an isolated station, where it is connected across a pair of conductors conveying current from the central office battery, the latter battery will be charged at intervals, for example, daily, from a suitable generator. At such time the voltage impressed on the terminals of the central office battery is greater than at the terminals at the floating battery. Charging current will flow through the conductors and through the floating battery, and gas will be evolved in the battery and will pass through the vents and the liquid in the reservoir as hereinbefore described. The refilling action of the battery depends upon the fact that occasionally on account of changes of the central battery voltage, the voltage impressed on the floating battery will be insufficient to cause a charging current to pass into it and at such times, no gas will be evolved in the floating battery and none will, therefore, pass out through the vents. If, during such periods, which in practice occur at least once a day and are of considerable duration, the pressure of the atmosphere plus the weight of the liquid in the reservoir becomes greater than the pressure on the gases remaining in the cells, liquid from the reservoir will pass downwardly through the vents to make up the loss of electrolyte in the cells. Of course, at any interval, a few drops merely of liquid are required so that the relatively minute ducts are capable of admitting sufficient liquid. The cause of such external pressure may be either a condition, under which the temperature of the outer air is greater than the temperature of the cell and its inclosed gases because of sudden temperature changes, or sufficient pressure differences may result from the usual barometric changes, or the combination of temperature and barometric changes may serve to effect the movement of the liquid as described.

It is obvious that if a single cell is employed in the battery, no short circuit through the inlet ducts could be possible. However, in the application of my invention, I contemplate the use of a multiple cell battery from the cells of which the gases are vented to a common reservoir. In such a battery, the vent tubes constitute short circuit or current leakage paths from cell to cell, resulting in loss of charge. However, as pointed out the ducts are only filled with liquid for a short time and at relatively remote intervals and in any event, the ducts are sufficiently long when compared with a relatively small diameter, so that the resulting high resistance to the passage of current insures against any substantial leakage. When the battery as described is employed as a floating battery in a circuit such as is hereinafter defined, the loss due to short circuit is so small as to be of no moment.

As a suitable liquid in the reservoir, I may employ pure or distilled water, but I prefer to use dilute acid for the reason that after prolonged action, some of the sulfuric acid in the electrolyte becomes inactive. I, therefore, prefer to employ enough acid in the reservoir liquid to insure that the electrolyte remains at the proper strength through the life of the battery.

The invention will be more readily understood by reference to the drawing in which 5 indicates a central station battery which is charged from time to time from the generator 6 when the switch 7 is closed. The battery 5 is connected by conductors 8 and 9, introducing resistance, to an electro-magnetic device 10 controlled, for example, by a circuit closer 11. A floating battery 12 is connected to the conductors 8 and 9 in parallel and is thus adapted to receive current continuously from the battery 5 until the voltage is equalized at the two batteries when no further current will pass. Upon closure of the circuit at 11, current passes the electro-magnetic device 10 thus partially discharging the battery 12, which is recharged from the battery 5. The general purpose and utility of the invention as applied to a particular circuit being clear, I shall proceed to describe the battery 12 in detail in order that my invention may be clearly understood.

Referring to Figs. 2 to 4 inclusive of the drawing, the battery preferably comprises an outer casing 15 in which an inner casing 16 is disposed, the inner casing being separated by partitions 17 into compartments adapted to contain the battery elements and the electrolyte which may, for example, be a sulfuric acid solution of substantially 1.3 specific gravity. The outer and inner casings 15 and 16 may be constructed of any suitable material, for example, hard rubber or vulcanite. The battery elements may comprise the usual positive and negative plates 18 and 19 with separators 20. The exact form, construction and material of the plates is not essential to the present invention and the cells may, therefore, conform in these details to well known practice in battery construction.

The cells are closed by covers 21 and the battery is sealed by a layer 22 of wax or other suitable material to prevent the entrance of liquid to the cells except as hereinafter described. The positive and negative elements of the cells at the opposite ends of the battery are connected to conductors 23 and 24 surrounded, within the casing 15, by suitable insulating sleeves 25, the conductors serving to convey the current from the battery to the external circuit. The elements of the intermediate cells are connected to each other and to the elements in the cells at the ends of the battery by connectors 26 embedded within the layer 22, so that they are thoroughly insulated. The outer casing 15 is provided with a closure 27 having a filling opening 28 which is normally sealed by a threaded plug 29 provided with ducts 30 for the escape of gases from the casing.

The outer casing 15 is filled with pure or distilled water or with a solution of sulfuric acid of from 1.1 to 1.2 specific gravity. This water or acid solution is adapted to replenish the liquid in the cells and for this purpose each of the cells is connected through a duct 31 of capillary diameter and substantial length to the space above the cells in the outer casing in which the replenishing liquid is maintained. The entrance of the liquid through the ducts 31 has been hereinbefore explained and it will be apparent from the foregoing description that I have provided a battery, the cells of which are automatically replenished from time to time so that the battery may be employed at isolated stations and will be maintained in effective operation for extended periods without attention.

In Fig. 5 of the drawing, I have illustrated a form of my invention employing a single cell and it is to be understood that while I prefer the multiple cell arrangement as hereinbefore described, my invention may be embodied in a battery such as is illustrated in Fig. 5, and that such batteries may be used singly or that a plurality of such batteries may be connected in the usual manner to furnish current as required.

Referring to Fig. 5, outer and inner casings 35 and 36 are employed and positive and negative elements 37 and 38 are disposed within the inner casing which is sealed by a cover 39 and a layer 40 of wax or other suitable material. The seal is filled with a suitable electrolyte such as the sulfuric acid solution hereinbefore described. The elements 37 and 38 are connected to conductors 41 and 42 surrounded by insulating sleeves 43 which convey the current to the external circuit. The outer casing 35 is closed at its top 44 and is provided with a filling opening 45 in which a plug 46 is threadedly mounted. Ducts 47 permit the escape of gases from the casing 35 in which the replenishing liquid, consisting of water or a sulfuric acid solution, is disposed. The replenishing duct 48 permits the entrance of liquid, maintained in the casing 35, to the cell as hereinbefore described.

As above noted, the self-filling battery is peculiarly adapted for use in telephone circuits. It may also be employed in telegraph and signalling circuits, and in fact may be advantageously used wherever the battery may be disposed in a closed circuit including a source of current, and employed as a reservoir of current.

Various changes may obviously be made in the form, construction and arrangement of the parts without departing from the invention or sacrificing any of the advantages hereinbefore enumerated or resulting from the invention.

I claim:

1. In an electric storage battery, the combination of a storage cell, a superposed reservoir for liquid, and means whereby liquid from said reservoir is permitted to enter and replenish the liquid in said cell, said means permitting the liquid to flow by gravity into said cell and being normally maintained inoperative by the gases evolved in said cell.

2. In an electric storage battery, the combination of a storage cell, a reservoir for liquid, and a duct, of substantially capillary diameter connecting said cell and reservoir, through which liquid from said reservoir is permitted to enter and replenish the liquid in said cell, said duct being normally filled with gas evolved in said cell whereby entrance of liquid is prevented.

3. In an electric storage battery, the combination of a storage cell, a reservoir for liquid, and a duct, of substantial length and capillary diameter connecting said cell and reservoir, through which liquid from said reservoir is permitted to enter and replenish the liquid in said cell.

4. In an electric storage battery, the combination of a storage cell, a superposed reservoir containing liquid sufficient to maintain said cell for an extended period, and a duct, connecting said reservoir and cell, of dimensions adapted to permit gases generated in said cell to escape and to prevent entrance of liquid while said gases are being generated.

5. In an electric storage battery, the combination of a plurality of storage cells, a reservoir for liquid and capillary means connecting said reservoir and cells whereby liquid from said reservoir is permitted to enter said cells, when the pressure of gases evolved therefrom is relieved.

6. In an electric storage battery, the combination of a storage cell, an outer casing inclosing said cell and providing a reservoir for liquid above said cell, a capillary duct connecting said cell and reservoir and adapted to permit liquid to enter said cell only when said duct is not filled with gas and an outlet for the gas from said reservoir.

7. In an electric storage battery, the combination of a plurality of electrically connected storage cells, a reservoir for liquid above said cells, capillary ducts connecting said reservoir and cells adapted to permit the entrance of liquid to said cells when said ducts are not filled with gas and an outlet for the gas from said reservoir.

8. In an electric storage battery, the combination of a plurality of electrically connected storage cells, a reservoir for liquid, capillary means permitting the escape of gas from said cells to said reservoir and the entrance of liquid from time to time to said cells, and means permitting the escape of gas from said reservoir.

9. In an electric storage battery, the combination of a plurality of electrically connected storage cells, a casing inclosing said cells and providing a reservoir for liquid above said cells, means providing an outlet for gas from each of said cells to said reservoir, each outlet being of substantially capillary dimensions and means permitting the escape of gas from said reservoir.

10. In an electric storage battery, the combination of a plurality of electrically connected storage cells, a casing inclosing said cells and providing a reservoir for liquid above said cells, separate outlets permitting the escape of gas from said cells to said reservoir, said outlets also serving to admit liquid to said cells when no gas is escaping therefrom and insulated conductors extending through said reservoir and permitting connection of said cells to an external circuit.

11. In an electric storage battery, the combination of a plurality of electrically connected cells, a reservoir above said cells adapted to maintain a supply of liquid, and a plurality of ducts, connecting the individual cells to the reservoir, through which liquid is from time to time delivered to said cells, the dimensions of said ducts being such as to provide sufficient resistance to prevent substantial leakage of current between said cells when said ducts are filled with liquid.

12. In an electric storage battery, the combination of a plurality of cells, a common reservoir, and individual vents permitting escape of gases from said cells to said reservoir and the entrance of liquid to said cells at intervals when no gases are escaping, the dimensions of said vents being such that leakage of current between the respective cells when the vents are filled with liquid is substantially prevented.

13. In an electric storage battery, the combination of a plurality of cells, a common reservoir, an insulating partition between said cells and reservoir, and a plurality of ducts extending through said partition and adapted to permit the escape of gases from said cells and the entrance of liquid to said cells when no gases are escaping, the dimensions of said ducts being such that leakage of current between the respective cells when said ducts are filled with liquid is substantially prevented.

14. In an electric storage battery, the combination of a plurality of cells, a common reservoir, an insulating partition between said cells and reservoir, electrical connections between said cells and embedded in said partition, terminal conductors providing communication between said cells and reservoir, the dimension of said ducts being such as to substantially preclude current leakage between said cells when said ducts are filled with liquid.

15. In an electric storage battery, the combination of a plurality of cells, a closed liquid reservoir, an insulating partition between said cells and reservoir, electrical connections between said cells and embedded in said partition, terminal conductors extending to said partition and reservoir, individual ducts providing communication between said cells and reservoir, the dimensions of said ducts being such as to substantially preclude current leakage between said cells when said ducts are filled with liquid and an outlet from said reservoir to permit escape of gases therefrom.

In testimony whereof I affix my signature.

NORMAN DEXTER STURGES.